United States Patent [19]
Peel et al.

[11] Patent Number: 5,813,765
[45] Date of Patent: Sep. 29, 1998

[54] EXTERIOR TEMPERATURE SENSOR ON ANTENNA FINIAL

[75] Inventors: Christopher Edward Peel, Noblesville; Robert Julius Pinto, Kokomo; Myron Glen Padgett, Greentown, all of Ind.

[73] Assignee: Delco Electronics Corporation, Kokomo, Ind.

[21] Appl. No.: 783,842

[22] Filed: Jan. 13, 1997

[51] Int. Cl.⁶ .......................... G01K 1/14; G01K 13/00
[52] U.S. Cl. .................. 374/141; 374/208; 343/720
[58] Field of Search ......................... 374/141, 152, 374/163, 170, 179, 208, 209; 343/715, 720

[56] References Cited

U.S. PATENT DOCUMENTS

| | | | |
|---|---|---|---|
| 2,638,785 | 5/1953 | Vacanti et al. | 374/141 |
| 2,878,673 | 3/1959 | Christensen | 374/141 |
| 2,899,549 | 8/1959 | Potter | 343/720 |
| 2,901,907 | 9/1959 | Ashcroft | 374/414 |
| 2,964,746 | 12/1960 | Trudnak, Jr. et al. | 343/720 |
| 3,196,684 | 7/1965 | Vernon, Sr. | 374/141 |
| 3,902,368 | 9/1975 | Hasenbein et al. | 374/141 |
| 4,182,182 | 1/1980 | Stortz | 374/141 |
| 4,891,252 | 1/1990 | Kaiser, Jr. | 374/208 |
| 4,955,980 | 9/1990 | Masuo | 374/208 |
| 5,199,790 | 4/1993 | Pawelzik et al. | 374/208 |
| 5,441,344 | 8/1995 | Cook, III | 374/141 |

FOREIGN PATENT DOCUMENTS

| | | | |
|---|---|---|---|
| 1133082 | 3/1957 | France | 374/141 |
| 1548986 | 12/1968 | France | 374/141 |
| 5-187924 | 7/1993 | Japan | 374/141 |

*Primary Examiner*—G. Bradley Bennett
*Attorney, Agent, or Firm*—Jimmy L. Funke

[57] ABSTRACT

A temperature sensing system for sensing ambient temperature around a vehicle. The sensing system includes a temperature sensor, such as a thermistor or thermocouple, positioned within the antenna finial of a fixed-mast antenna of the vehicle. A sensor signal from the sensor is applied to a sensor circuit that includes suitable filtering components. The filtered sensor signal is then applied to a microcontroller where the signal is processed to display the exterior temperature on display within the vehicle passenger compartment. A sensor lead and a return lead are wrapped around the mast antenna to transfer the sensor signal from the sensor to the sensor circuit. The mast antenna is wrapped with a shrink-type tubing or covered with an epoxy-type coating to cover the sensor lead and return lead. The presence of the wires provides the added benefit of reducing wind noise traditionally associated with the antenna mast.

19 Claims, 2 Drawing Sheets

_5,813,765_

EXTERIOR TEMPERATURE SENSOR ON ANTENNA FINIAL

BACKGROUND OF THE INVENTION

1. Field of the Invention

This invention relates generally to an exterior temperature sensor for a vehicle, and more particularly, to an exterior temperature sensing system for a vehicle including a temperature sensor located in the finial of a fixed-mast antenna of the vehicle.

2. Discussion of the Related Art

It has heretofore been known to equip certain vehicles with an exterior temperature sensing system that monitors ambient temperature around the vehicle, and generates a signal indicative of this temperature. The signal is processed and then displayed within the passenger compartment of the vehicle to be viewed by the vehicle occupants. Known vehicle exterior temperature systems include some type of a temperature sensor, such as a thermistor or a thermocouple, located on the vehicle at a location that is exposed to a flow of exterior ambient air. Known temperature sensors have been located under the hood of the vehicle directly in front of the vehicle cooling system radiator to satisfy this condition.

A sensor signal generated by the sensor in the known exterior temperature sensing system is applied to a sensing circuit for processing. The sensing circuit generally includes an analog-to-digital convertor that converts the analog temperature signal to a digital signal suitable to be deciphered by a digital microcontroller. The microcontroller is programmed to decipher the digital temperature signal to provide an accurate indication of the exterior temperature. This temperature is then displayed on a vehicle display system in a manner dependent on the particular vehicle passenger compartment layout.

The current temperature sensor implementations have lengthy and usually costly validation requirements. The microcontroller must be programmed to compensate for all practical conditions where the temperature sensor may be influenced by extenuating conditions to give an accurate temperature reading, and thus must be calibrated for certain things such as vehicle speed, engine coolant temperature, etc. Because the sensor is usually positioned adjacent to the vehicle radiator, significant software implementation and extensive calibration are required in the microcontroller to compensate for the heating effects of the radiator. Additionally, significant software implementation and calibration is required for other possible heating conditions when the sensor is in this position. For example, the vehicle may be parked in front of a wall on a hot day, or at a stop light, or some other location, where the radiative heat from the wall, or other objects, will influence the temperature measurement made by the sensor.

There is a growing demand for providing exterior temperature sensing for almost all types of vehicles. Therefore, it is necessary to reduce the cost of these systems, and increase production feasibility to provide exterior vehicle temperature measurements that are more accurate, require less validation effort, and would likely result in a lower overall system cost than currently existing techniques. It is therefore an object of the present invention to provide such an exterior temperature sensing system.

SUMMARY OF THE INVENTION

In accordance with the teachings of the present invention, an exterior temperature sensing system for sensing ambient air temperature around a vehicle is disclosed. The exterior temperature sensing system includes a temperature sensor, such as a thermistor or thermocouple, positioned within the antenna finial of a mast antenna of the vehicle. A sensor signal from the sensor is applied to a sensor circuit that includes suitable filtering components. The filtered sensor signal is then applied to a microcontroller where the signal is processed to display the exterior temperature on a display within the vehicle passenger compartment.

In one particular embodiment, a sensor lead and a return lead are wrapped around the mast antenna, and are electrically connected to suitable connections in an antenna base at a location where the antenna is secured to the vehicle. The mast of the antenna is wrapped in a shrink-type tubing or covered with an epoxy-type coating to secure the sensor lead and return lead to the mast. The presence of the wiring will cause the flow of air past the antenna mast to be disturbed such that wind noise is reduced, as is accomplished in existing mast antenna implementations. Other techniques for connecting the sensor to the sensor circuit can be provided within the scope of the present invention.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to an exterior temperature sensing system for a vehicle that includes a temperature sensor positioned within a finial of a mast antenna is merely exemplary in nature, and is in no way intended to limit the invention or its applications or uses.

Figure 1:
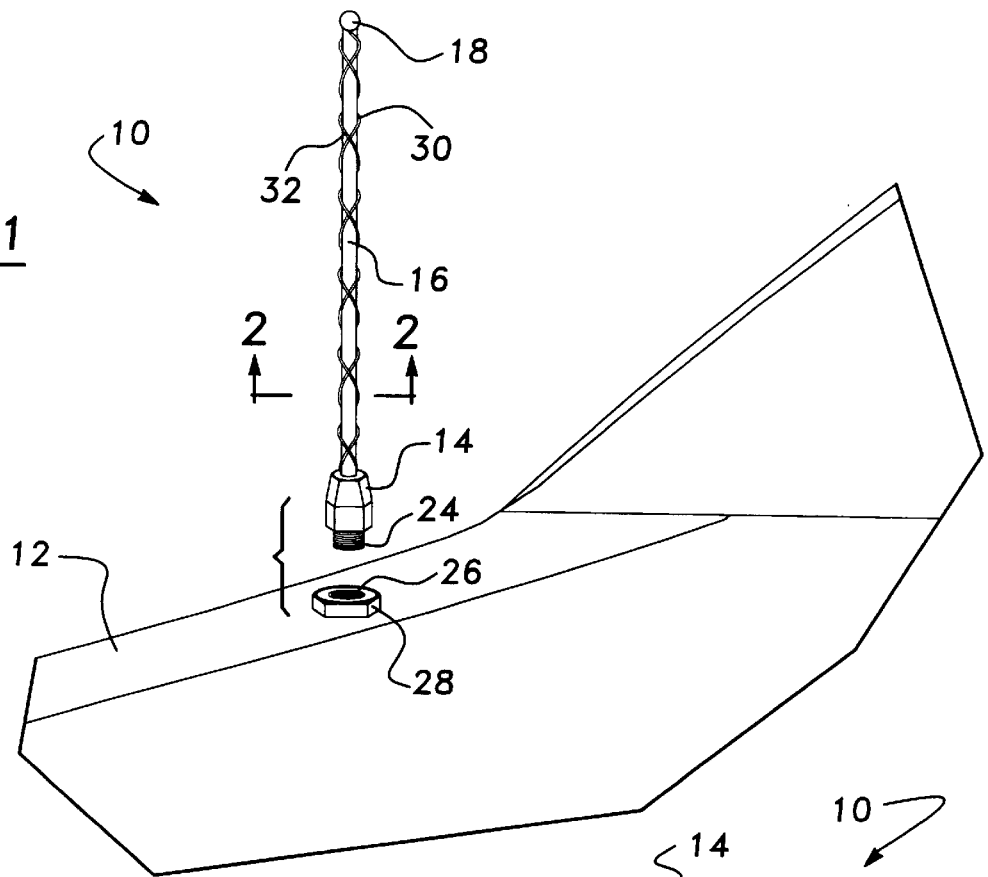
FIG. 1 is a broken away perspective view showing a fixed-mast antenna relative to a vehicle that incorporates a temperature sensor within the antenna finial, in accordance with an embodiment of the present invention.

FIG. 1 shows a perspective view of a fixed-mast antenna 10 secured to a broken away portion of a vehicle 12. Depending on the make and model of the vehicle 12, the mast antenna 10 can be secured to any number of suitable locations on the vehicle 12, such as on top of a right or left front quarter panel, right or left rear quarter panel, or extending from a roof of the vehicle 12. As will be appreciated by those skilled in the art, the exterior temperature sensing system of the invention described below is applicable to be used with a mast antenna at any locations on a vehicle.

The mast antenna 10 includes a hex base 14, a mast 16 extending from the hex base 14, and an antenna finial 18 covering an opposite end of the mast 16 from the hex base 14. Antenna finials are known parts of mast antennas that provide safety against the sharp end of the mast 16 and provide ornamentation. The antenna finial 18 has a ball shape in this embodiment, but can take on any suitable shape. The finial 18 can be made of any desired material suitable for its intended purpose, such as brass, other metals, plastic, etc. A mounting bolt 24 that is electrically connected to the antenna mast 10 extends from the bottom of the hex base 14, and is threadably engageable within a threaded opening 26 of an antenna base 28 secured to the vehicle 12 to secure the antenna 10 to the vehicle 12. Although the base 14 is shown in a hex configuration, any suitable configuration that allows the antenna 10 to be threadably secured to and removed from the vehicle 12 can be used. The configuration of the antenna 10 as described so far is conventional in the art.

According to the invention, a suitable sensing element, such as a thermistor or thermocouple (see FIG. 7), is secured within the antenna finial 18, and is applicable to sense the ambient air temperature around the antenna 10. In one embodiment, the sensing element is positioned within a specially configured opening (not shown) in the finial 18. Alternatively, the sensing element can be molded or formed into the finial 18 itself. The antenna finial 18 can be provided with a reflective outer coating, such as a chrome coating, so that it minimizes heat absorption that would adversely affect an accurate temperature reading by the sensing element within the finial 18.

A sensor lead 30 is connected to the sensing element within the finial 18, and is helically wrapped around the mast 16. A return lead 32, acting as an electrical ground lead, is also connected to the sensing element within the finial 18, and is helically wrapped around the mast 16. In one embodiment, the sensor lead 30 and the return lead 32 are coated 28-gauge wires that are wrapped in opposite directions around the mast 16 approximately four to six times. Of course, the sensor lead 30 and the return lead 32 can be wrapped around the mast 16 any practical number of times in any practical configuration within the scope of the invention. Also, the sensor lead 30 and the return lead 32 can be any other suitable gauge wire, such as 22-gauge. The sensor lead 30 is electrically connected to one electrically isolated region of the hex base 14, and the return lead 32 is electrically connected to another electrically isolated region of the hex base 14.

Figure 2:
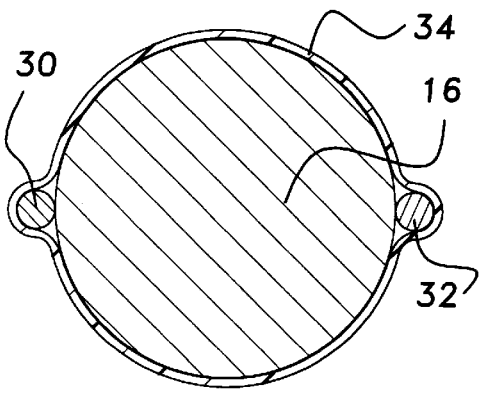
FIG. 2 is a cross-sectional view of the mast antenna through line 2—2.

It is known in the art to wrap a wire around a mast antenna of a vehicle in order to cause air turbulence to reduce or eliminate the whistling noise that may be caused by air flowing across the mast 16. The present invention proposes using these wires as the sensor lead 30 and/or the return lead 32. In one embodiment, the mast 16 is wrapped with a plastic shrink tubing 34, or other suitable coating, to securely hold the sensor lead 30 and the return lead 32 to the mast 16. In another embodiment, the sensor lead 30 and the return lead 32 can be secured to the mast 16 by a suitable epoxy, shrink wrapping or the like. FIG. 2 shows a cross-sectional view of the antenna 10.

Figure 3:
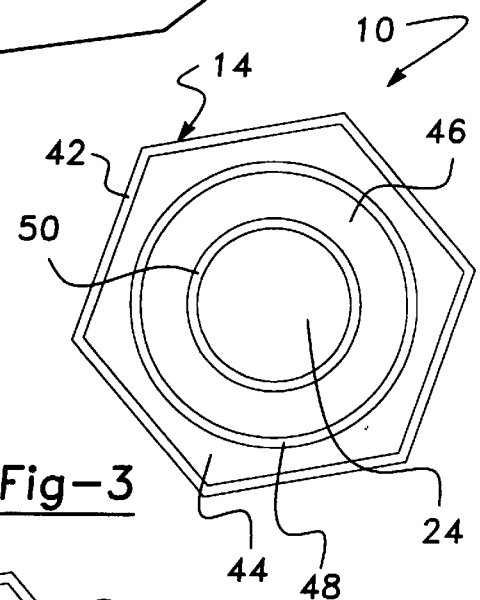
FIG. 3 is a bottom view of the mast antenna shown in FIG. 1 separated from the vehicle.

FIG. 3 shows a bottom view of the mast antenna 10. An insulator ring 42, made of a suitable non-conducting material, such as a plastic, is wrapped around the hex base 14 to electrically isolate the base 14 from the vehicle 12 and other electrically conductive components. The sensor lead 30 is electrically connected to an electrically conductive sensor lead ring 44, and the return lead 32 is electrically connected to an electrically conductive return lead ring 46. The return lead ring 46 is electrically isolated from the sensor lead ring 44 by an insulator ring 48, and the return lead ring 46 is electrically isolated from the mounting bolt 24 by an insulator ring 50.

Figure 4:
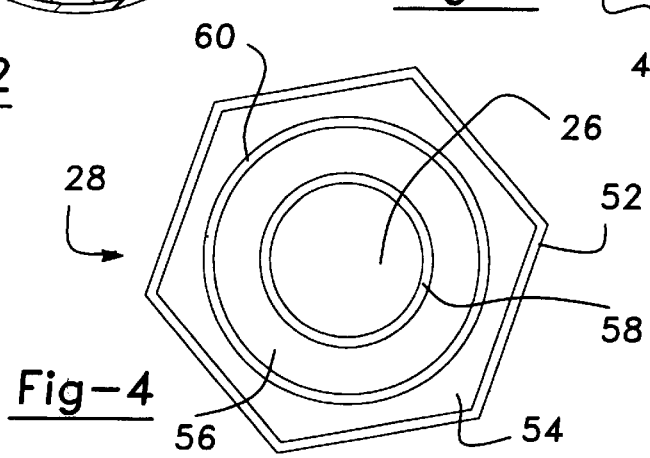
FIG. 4 is a top view of an antenna base separated from the vehicle that secures the mast antenna to the vehicle.

A top view of the antenna base 28 removed from the vehicle 12 is shown in FIG. 4. An antenna base insulator ring 52 is wrapped around the antenna base 28 to electrically isolate the base 28 from the vehicle 12 and other electrically conductive components. The mast bolt 24 is threadably engaged into the threaded opening 26 at the center of the antenna base 28 so as to secure the antenna 10 to the vehicle 12. The antenna base 28 is configured such that an antenna base sensor lead ring 54 is electrically connected to the mast antenna sensor lead ring 44, and an antenna base return lead ring 56 is electrically connected to the mast antenna return lead ring 46 when the antenna 10 is threadably engaged to the antenna base 28. The antenna base return lead ring 56 is electrically isolated from the opening 26 by an insulator ring 58, and is electrically isolated from the antenna base sensor lead ring 54 by an insulator ring 60.

Figure 5:
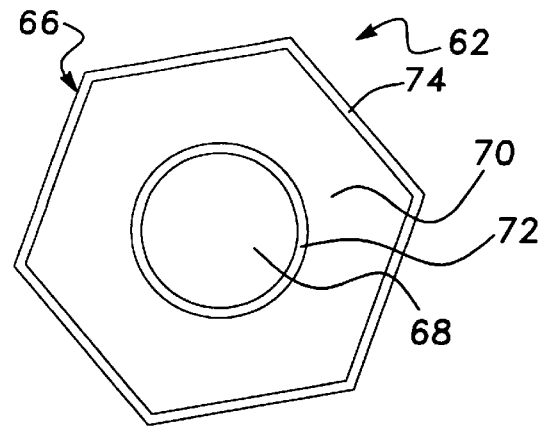
FIG. 5 is a bottom view of another mast antenna according to an alternate embodiment of the present invention.
Figure 6:
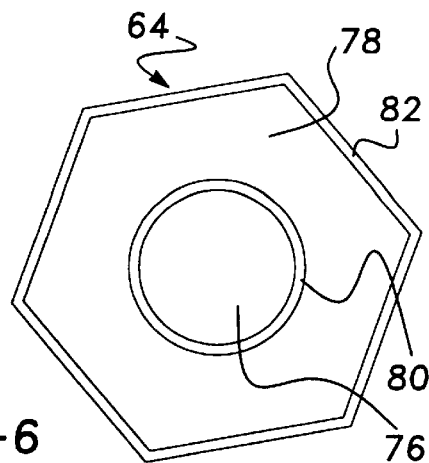
FIG. 6 is a top view of another antenna base according to the alternate embodiment of the present invention.

The electrical connection between the sensing element in the finial 18 and the antenna base 28 described above is by way of a non-limiting example in that several other ways exist. For example, the sensor lead 30 can be wrapped around the mast 16, and the return lead can be the mast 16 itself where the bolt 24 provides the electrical connection of the return lead from the antenna 10 to the antenna base 28. FIGS. 5 and 6 show an example of this embodiment. FIG. 5 is a bottom view of a mast antenna 62, and FIG. 6 is a top view of an antenna base 64 according to another embodiment of the present invention. The antenna 62 includes a hex base 66 having a mounting bolt 68 that is electrically connected to the antenna mast 16. An electrically conductive sensor lead ring 70 is electrically isolated from the mounting bolt 68 by an insulator ring 72, and the lead ring 70 is electrically isolated from the vehicle 12 by an insulator ring 74.

For the antenna base 64, a threaded opening 76 accepts the bolt 68 in a threadable engagement, and makes electrical contact for the antenna mast return lead. An antenna base sensor lead ring 78 makes electrical contact with the sensor lead ring 70. An insulator ring 80 electrically isolates the opening 76 from the sensor ring 78, and an insulator ring 82 electrically isolates the sensor lead ring 78 from the vehicle 12.

In other embodiments, both the sensor lead and the return lead can be coaxially distributed within the mast 16. Basically, any suitable manner for transferring the electrical signal from the finial 18 to the vehicle 12 can be used.

Figure 7:
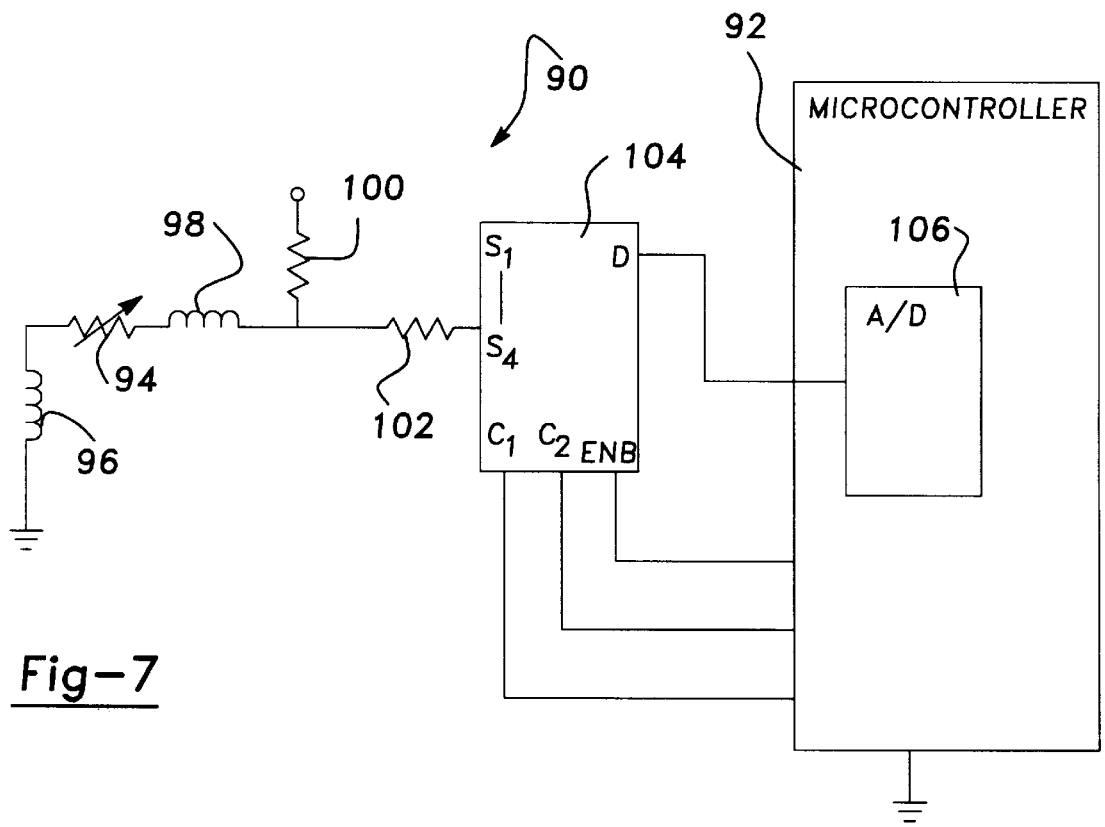
FIG. 7 is a schematic diagram of an interface circuit for a temperature sensor system of the invention.

FIG. 7 shows a schematic diagram of an interface circuit 90 that receives the sensor signal from the antenna base 28, and applies it to a microcontroller 92 for processing to generate a signal indicative of the ambient exterior temperature. A thermistor 94 represents the sensing element within the antenna finial 18. A first radio frequency (RF) choke 96 acts as a bandpass filter to filter out RF signals outside of a predetermined range between the thermistor 94 and ground, and a second RF choke 98 acts as a filter to allow only the direct current signal from the sensor 94 to be applied to the microcontroller 92. The RF chokes 96 and 98 filter the sensor signal so as to help prevent degradation of the AM and FM performance of the antenna 10. A power signal from a vehicle battery (not shown) powers the interface circuit 90 through a compensation resistor 100. The compensation resistor 100 and the thermistor 94 make up a voltage divider circuit that divides the voltage signal of the sensor 94 to a level suitable for the microcontroller 92. A sensing resistor 102 protects the microcontroller 92 against over current in the circuit 90.

The divided sensor voltage is applied to a multiplexer 104 along with a plurality of other analog voltage signals from other vehicle sensors, such as a coolant temperature sensor, solar load sensor, in-vehicle temperature sensor, etc. In this example, there are four analog sensing signals applied to the multiplexer 104. An enable input, and first and second select inputs $C_1$ and $C_2$, are applied to the multiplexer 104 from the microcontroller 92 so as to select which of the analog sensor inputs to the multiplexer 104 will be applied to the microcontroller 92 at an output D. The analog sensor signal from the sensor 94 is applied from the multiplexer 104 to an analog-to-digital (A/D) converter 106 within the microcontroller 92 in order to convert the analog signal to a digital signal suitable for the microcontroller 92. The microcontroller 92 then processes the indicative digital signal to provide calibration, temperature compensation, etc. to arrive at the ambient temperature signal.

Figure 8:
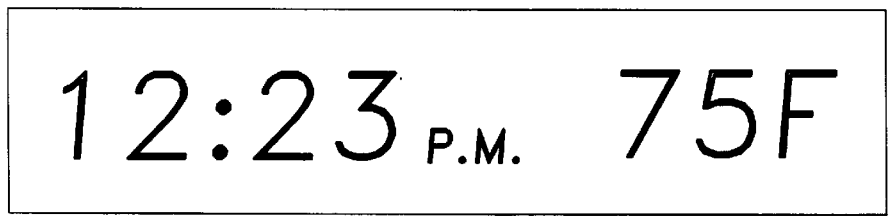
FIG. 8 is a radio display that displays exterior vehicle temperature.

In one embodiment, the temperature signal from the microcontroller 92 is then applied to radio circuitry within a vehicle radio (not shown) to display the temperature signal in a manner understood by occupants in the vehicle 12. FIG. 8 shows an example of a radio display in which the display shows the time and the temperature in degrees Fahrenheit. Alternately, the temperature signal from the microcontroller 92 can be interfaced with any existing temperature measurement system, such as an electronic climate control system, a mirror system with exterior temperature display, or overhead consoles with exterior temperature display. In general, any system capable of interfacing with such analog inputs can send the temperature data over a serial data bus to any point of display.

Testing with the antenna-mounted temperature sensor as described above, was performed on a 1996 Cadillac Seville STS, which has a dual-zone, electronic climate control system. Performance data was obtained over a range of extreme conditions, including sub-freezing, high solar load, high humidity/moisture, as well as for nominal ambient temperature/moisture conditions. The antenna system provides a more accurate measurement of exterior temperature over the range of expected conditions. Further, calibration efforts are minimized due to the reduced solar and radiative effects on the sensing element. Also, the low thermal mass of the mast antenna assembly minimizes the required software compensation/filtering usually needed. Further, system validation efforts are reduced, resulting in a lower overall system cost than those systems in the prior art.

Additional testing demonstrated that the antenna configurations described above do not unacceptably degrade antenna performance in the AM and FM frequency ranges. The additional testing was performed with a variety of the test antennas with different antenna/sensor configurations. Specific configuration variables included the effects of RF chokes, sensor lead lengths, sensor wire wrapping patterns, and sensor wire thicknesses. From a temperature monitoring perspective, the proposed invention is more accurate, requires less validation effort, and will likely result in lower overall system cost than existing techniques. From an antenna performance perspective, a viable antenna/sensor configuration has been developed that satisfies AM and FM performance requirements.

The foregoing discussion discloses and describes merely exemplary embodiments of the present invention. One skilled in the art will readily recognize from such discussion, and from the accompanying drawings and claims, the various changes, modifications and variations can be made therein without departing from the spirit and scope of the invention as defined in the following claims.

The embodiments of the invention in which an exclusive property or privilege is claimed are defined as follows:

1. A temperature sensing system for sensing ambient air temperature around a vehicle, said system comprising:
   a sensing element, said sensing element positioned within a finial of a mast antenna connected to the vehicle;
   a sensor lead electrically connected to the sensing element and extending down a mast of the antenna, said sensor lead being electrically connected to an antenna base at an end of the mast opposite to the finial; and
   an interface circuit, said interface circuit being responsive to a sensor signal from the sensor lead, and processing the sensor signal to provide a temperature signal indicative of the ambient air temperature.

2. The system according to claim 1 wherein the sensor lead is helically wrapped around an outside of the mast.

3. The system according to claim 2 further comprising a coating selected from the group consisting of a shrink-type plastic coating and an epoxy-type coating surrounding the sensor lead to hold the sensor lead securely to the mast.

4. The system according to claim 2 wherein the sensor lead is helically wrapped around the outside of the mast in the range of about four to about six times.

5. The system according to claim 1 further comprising a return lead, said return lead being electrically connected to the sensing element and being helically wrapped around the mast.

6. The system according to claim 5 wherein the sensor lead and the return lead are wrapped in opposite directions around the mast.

7. The system according to claim 1 wherein the sensor lead is positioned within the mast and is electrically isolated from a return lead also positioned within the mast.

8. The system according to claim 1 further comprising a temperature display, said temperature display displaying a degree reading of a temperature signal indicative of the ambient temperature, said temperature display being a display associated with a vehicle radio.

9. The system according to claim 1 wherein the antenna finial includes a reflective outer coating.

10. The system according to claim 1 wherein the sensing element is formed into the finial itself.

11. The system according to claim 1 wherein the interface circuit includes a first RF choke electrically connected between the sensing element and ground, and a second RF choke electrically connected to the sensor lead.

12. A temperature sensing system for sensing ambient air temperature around a vehicle, said system comprising:
    a sensing element, said sensing element positioned within a finial of a mast antenna connected to the vehicle;
    a sensor lead electrically connected to the sensing element, and being helically wrapped around an outside of a mast of the antenna, said sensor lead being electrically connected to an antenna base at an end of a mast opposite to the finial;
    a coating material surrounding the sensor lead to hold the sensor lead securely to the mast; and
    an interface circuit, said interface circuit being responsive to a sensor signal from the sensor lead, and processing the sensor signal to provide a temperature signal indicative of the ambient air temperature.

13. The system according to claim 12 further comprising a return lead, said return lead being electrically connected to the sensing element, and being helically wrapped around the mast in a direction opposite to the direction of the sensor lead, said return lead also being electrically connected to the antenna base.

14. The system according to claim 13 wherein the sensor lead and the return lead are wrapped around the mast in the range of about four to about six times.

15. The system according to claim 12 further comprising a temperature display, said temperature display displaying a degree reading of a temperature signal indicative of the ambient temperature, said temperature display being a display associated with a vehicle radio.

16. A method of sensing ambient air temperature around a vehicle, said method comprising the steps of:

providing a temperature sensing element;

positioning the sensing element within a finial of a mast antenna of a vehicle;

providing a sensor lead connected to the sensing element and to an interface circuit within the vehicle, said interface circuit processing a sensor signal from the sensing element; and providing a temperature display indicative of the ambient air temperature.

17. The method according to claim 16 wherein the step of providing a sensor lead includes wrapping the sensor lead around a mast of the mast antenna.

18. The method according to claim 16 further comprising the step of providing a return lead being part of the mast of the mast antenna.

19. The method according to claim 17 further comprising the step of providing a coating selected from the group consisting of a shrink-type plastic coating and an epoxy-type coating around the sensor lead to hold the sensor lead to the mast.

\* \* \* \* \*